(12) United States Patent
Liu

(10) Patent No.: US 9,066,327 B2
(45) Date of Patent: Jun. 23, 2015

(54) LOW ENERGY WIRELESS PROXIMITY PAIRING

(71) Applicant: Bose Corporation, Framingham, MA (US)

(72) Inventor: Peter T. Liu, Ashland, MA (US)

(73) Assignee: Bose Corporation, Framingham, MA (US)

( * ) Notice: Subject to any disclaimer, the term of this patent is extended or adjusted under 35 U.S.C. 154(b) by 109 days.

(21) Appl. No.: 13/923,499

(22) Filed: Jun. 21, 2013

(65) Prior Publication Data

US 2014/0378056 A1    Dec. 25, 2014

(51) Int. Cl.
*H04B 7/00*    (2006.01)
*H04W 76/02*    (2009.01)
*H04W 4/00*    (2009.01)
*H04W 52/02*    (2009.01)

(52) U.S. Cl.
CPC ............ *H04W 76/023* (2013.01); *H04W 4/008* (2013.01); *H04W 52/0245* (2013.01); *G08C 2201/12* (2013.01); *G08C 2201/20* (2013.01); *G08C 2201/91* (2013.01)

(58) Field of Classification Search
CPC ..... H04W 84/18; H04W 88/06; H04W 76/02; H04W 8/245; H04W 24/02; H04W 88/02; H04M 1/7253; H04M 1/72525; H04M 1/72522
USPC ................... 455/41.2, 418–420, 422.1, 456.1
See application file for complete search history.

(56) References Cited

U.S. PATENT DOCUMENTS

2010/0317289 A1* 12/2010 Desai et al. .................. 455/41.2
2012/0178471 A1*  7/2012 Kainulainen et al. ...... 455/456.1

FOREIGN PATENT DOCUMENTS

EP         2355563 A1    8/2011
WO    2010052669 A1    5/2010

OTHER PUBLICATIONS

Invitation to Pay Additional Fees dated Oct. 1, 2014 for International application No. PCT/US2014/040634.
"Specification of the Bluetooth System, Specification vol. 6", Jun. 30, 2010, pp. 2165-2300, XP55016390, Retrieved from the Internet: URL:http://www.bluetooth.com [retrieved on Jan. 12, 2012].
International Search Report and Written Opinion dated Nov. 10, 2014 for International application No. PCT/US2014/040634.

* cited by examiner

*Primary Examiner* — Nhan Le

(57) ABSTRACT

A method of pairing devices includes causing a Bluetooth-enabled host device and a Bluetooth-enabled peripheral device to be located proximate to each other, the Bluetooth-enabled host device comprising at least a processor, a memory and an antenna, in the Bluetooth-enabled host device, detecting advertising packets broadcast by the Bluetooth-enabled peripheral device on one or more of a plurality of advertising channels, saving a numeric indicator of each of multiple detected advertising packets, determining an average numeric indicator from the saved numeric indicators of each of the separately detected advertising packets, if the average numeric indicator exceeds a proximity threshold, determining whether a set of conditions are met, and initiating a Bluetooth device pairing sequence between the Bluetooth-enabled host device and the Bluetooth-enabled peripheral device if the set of conditions are met.

51 Claims, 2 Drawing Sheets

LOW ENERGY WIRELESS PROXIMITY PAIRING

BACKGROUND OF THE INVENTION

The present invention relates to wireless technology, and more specifically to a low energy wireless proximity pairing.

In general, Bluetooth wireless technology is a wireless communications system intended to replace the cables connecting electronic devices. Bluetooth low energy wireless technology includes ultra-low peak, average and idle power consumption, an ability to run for years on standard coin-cell batteries, low cost, multi-vendor interoperability and enhanced range. Reduced power consumption means longer battery life. Bluetooth is the link normally used to transport signals in operation, for example audio signals. Bluetooth LE is normally used to transport short pieces of information, for example telemetry signals. Bluetooth and Bluetooth LE use different radios; we refer to a device having both Bluetooth and Bluetooth LE radios as Bluetooth-enabled. In order for two devices to communicate over Bluetooth, they must first be paired. A pairing sequence between two Bluetooth devices requires power consumption, user setup actions on both devices, and time for the Bluetooth devices to discover each other. Bluetooth LE can be used to improve the pairing process by reducing power consumption, simplifying the user actions, and reducing the time for two Bluetooth-enabled devices to discover each other.

SUMMARY OF THE INVENTION

The following presents a simplified summary of the innovation in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

In a general aspect, an approach disclosed herein provides a way of pairing (e.g., establishing a wireless communication link between) a peripheral with a host device without requiring manual intervention to initiate or establish a pairing mode and/or limiting potential unintended pairing with distant host devices. By limiting initiation of pairing to situations in which the peripheral is in proximity of (e.g., directly adjacent to, within 2 cm of) the host undesired pairing with other hosts is avoided. The requirement for proximity to initiate pairing further provides a degree of security and/or privacy by avoiding such undesired pairing. Furthermore, by requiring proximity of the peripheral device and host device, substantially lower power is needed for the broadcasts by the peripheral than if longer-distance pairing was enabled, thereby conserving power (e.g., in a battery powered peripheral) and potentially reducing radio interference caused by the peripheral. In some examples, the peripheral further reduces power consumption and inadvertent pairing by limiting broadcasts according to particular operating modes, for instance, in an initial power-up mode extending from power-up by a fixed time duration. Lastly, pairing based upon proximity appeals to physical intuition of the end user, resulting in a better user experience.

In general, in one aspect, the invention features a method of pairing devices including causing a Bluetooth-enabled host device and a Bluetooth-enabled peripheral device to be located proximate to each other, the Bluetooth-enabled host device including at least a processor, a memory and an antenna, in the Bluetooth-enabled host device, detecting advertising packets broadcast by the Bluetooth-enabled peripheral device on one or more of a plurality of advertising channels, saving a numeric indicator of each of multiple detected advertising packets, determining an average numeric indicator from the saved numeric indicators of each of the separately detected advertising packets, if the average numeric indicator exceeds a proximity threshold, determining whether a set of conditions are met, and initiating a Bluetooth device pairing sequence between the Bluetooth-enabled host device and the Bluetooth-enabled peripheral device if the set of conditions are met.

Implementations may include, and are not limited to, one or more of the following features. The method may further include completing the Bluetooth device pairing sequence using information in one of the advertising packets.

The proximity threshold may be dependent upon a type of Bluetooth-enabled peripheral device and/or upon a type of Bluetooth-enabled host device.

Each of the advertising packets may be a non-connectable undirected packet containing a field containing a Bluetooth address of the Bluetooth-enabled peripheral device and a field containing an Extended Inquiry Response (EIR) record of the type Tx Power Level containing a predefined value for transmit power ($T_x$ Power) of the Bluetooth-enabled peripheral device. The Bluetooth address used by the Bluetooth LE radio is the device address of the Bluetooth radio of the Bluetooth-enabled peripheral device. The predefined value of $T_x$ Power of the Bluetooth-enabled peripheral device may be a number not ending in 0 or 5 to indicate to a Bluetooth-enabled host device that the Bluetooth-enabled peripheral device is a proximity pairing device.

The numeric indicator may be a received signal strength indicator (RSSI) of each of the separately detected advertising packets, a highest RSSI of the separately detected advertising packets or a RSSI of a first one of the detected advertising packets.

The set of conditions may include an average RSSI that is greater than the proximity threshold value for 500 milliseconds (ms) and a pre-populated transmit power ($T_x$ Power) in the non-connectable undirected packet of Bluetooth-enabled peripheral device that equals −21 dBm.

The Bluetooth-enabled host device may be a smartphone, a tablet computer, a personal computer, a laptop computer, a notebook computer, a netbook computer, a radio, an audio system, an Internet Protocol (IP) phone, a communication system, an entertainment system, a headset and a speaker.

The Bluetooth-enabled peripheral device may be a headphone, a headset, an audio speaker, an entertainment system, a communication system and a smartphone.

In one aspect, the invention features a Bluetooth-enabled peripheral device including a radio transceiver, a baseband unit, a software stack, the software stack configured to advertise using a non-connectable undirected packet (ADV_NON-CONN_IND PDU) in all three Bluetooth advertising channels, the non-connectable undirected packet including a field containing a Bluetooth address of the Bluetooth-enabled peripheral device and a field containing an Extended Inquiry Response (EIR) record of a type $T_x$ Power Level containing a predefined value for transmit power ($T_x$ Power) of the Bluetooth-enabled peripheral device.

Implementations may include, and are not limited to, one or more of the following features. The predefined $T_x$ Power of the Bluetooth-enabled peripheral device may be a number not ending in 0 or 5 to indicate to a Bluetooth-enabled host device that the Bluetooth-enabled peripheral device is a proximity pairing device.

These and other features and advantages will be apparent from a reading of the following detailed description and a review of the associated drawings. It is to be understood that both the foregoing general description and the following detailed description are explanatory only and are not restrictive of aspects as claimed.

BRIEF DESCRIPTION OF THE DRAWINGS

The invention will be more fully understood by reference to the detailed description, in conjunction with the following figures, wherein.

DETAILED DESCRIPTION

Figure 1:
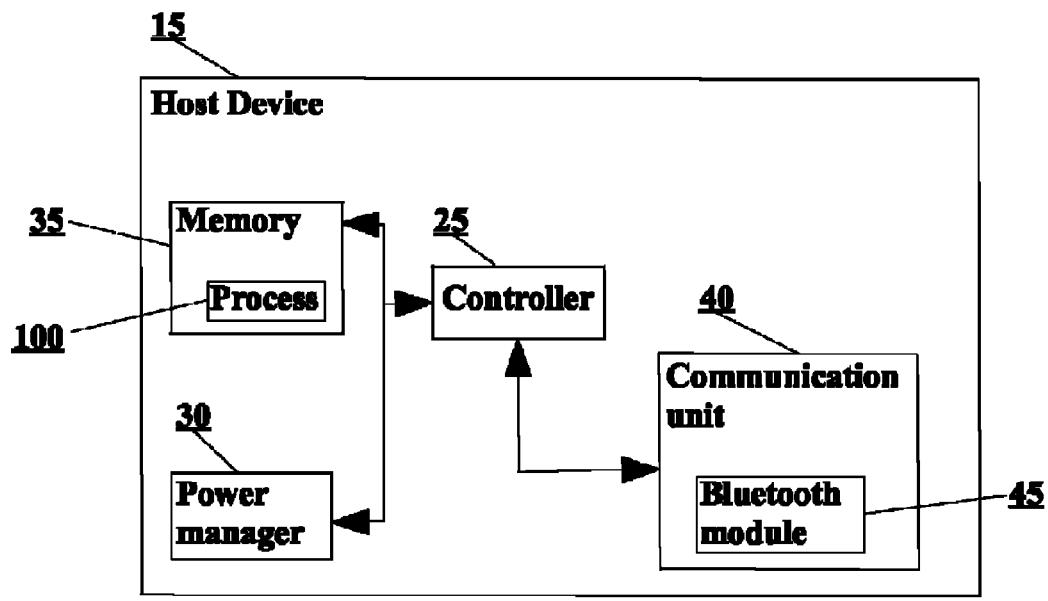
FIG. 1 is a block diagram of an exemplary Bluetooth system.
Figure 1:
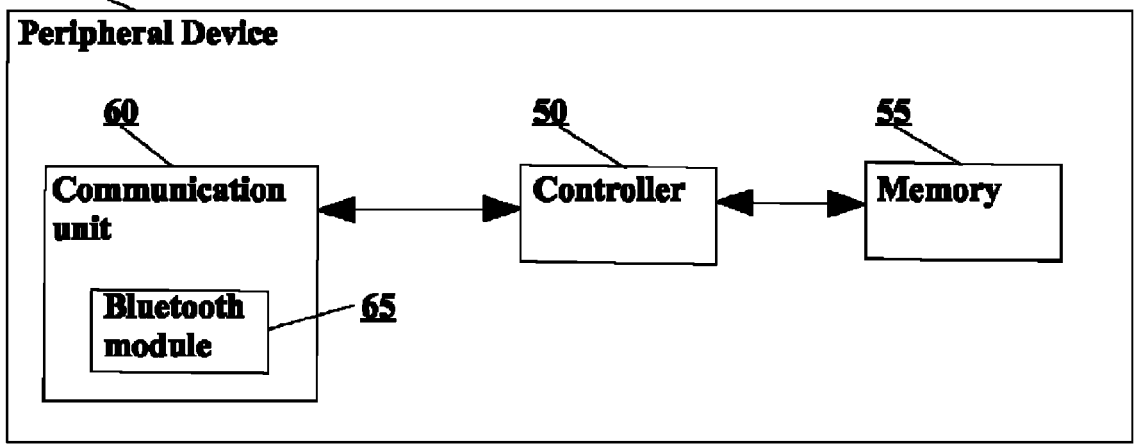

The subject innovation is now described with reference to the drawings, wherein like reference numerals are used to refer to like elements throughout. In the following description, for purposes of explanation, numerous specific details are set forth in order to provide a thorough understanding of the present invention. It may be evident, however, that the present invention may be practiced without these specific details. In other instances, well-known structures and devices are shown in block diagram form in order to facilitate describing the present invention.

As used in this application, the term "or" is intended to mean an inclusive "or" rather than an exclusive "or." That is, unless specified otherwise, or clear from context, "X employs A or B" is intended to mean any of the natural inclusive permutations. That is, if X employs A, X employs B, or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

As shown in FIG. 1, an exemplary system 10 includes a Bluetooth-enabled host device 15 and a Bluetooth-enabled peripheral device 20. Example Bluetooth-enabled host devices 15, include, but are not limited to, a smartphone, a tablet computer, a personal computer, a laptop computer, a notebook computer, a netbook computer, a radio, an audio system, an Internet Protocol (IP) phone, a communication system, an entertainment system, a headset, a speaker, and so forth. Example Bluetooth-enabled peripheral devices 20 include, but are not limited to, a headphone, a headset, an audio speaker, an entertainment system, a communication system, a smartphone, and so forth. A Bluetooth-enabled device as described herein may change its role from host to peripheral or peripheral to host depending on a specific application.

The Bluetooth-enabled host device 15 can include a controller 25, a power manager 30, a memory 35, and a communication unit 40. The communication unit 40 includes a Bluetooth module 45.

The controller 25 controls the general operation of the Bluetooth-enabled host device 15. For example, the controller 25 performs a process and control for audio and data communication. In addition to the general operation, the controller 25 initiates a Bluetooth function implemented in the Bluetooth module 45 upon detecting certain events, fully described below. The controller 25 initiates an operation (e.g., pairing) necessary for a Bluetooth connection of the Bluetooth-enabled host device 15 and the Bluetooth-enabled peripheral device 20 if specific conditions are satisfied.

The memory 35 may include a Read Only Memory (ROM), a Random Access Memory (RAM), and a flash ROM. The ROM stores a microcode of a program for processing and controlling the controller 25 and a variety of reference data.

The RAM stores data generated during execution of any of the variety of programs performed by the controller 25. The RAM (or ROM) includes a Bluetooth Low Energy (BLE) proximity process 100, fully described below. The flash ROM stores various updateable data for safekeeping such as a phone book, outgoing messages, incoming messages and the like.

The Bluetooth module 45 enables a wireless connection using Radio Frequency (RF) communication between the Bluetooth-enabled host device 15 and the Bluetooth-enabled peripheral device 20. The Bluetooth module 45 exchanges a radio signal including data input/output through an antenna (not shown). For example, in a transmission mode, the Bluetooth module 45 processes data by channel coding and spreading, converts the processed data into a Radio Frequency (RF) signal and transmits the RF signal. In a reception mode, the Bluetooth module 45 converts a received RF signal into a baseband signal, processes the baseband signal by de-spreading and channel decoding and restores the processed signal to data.

The Bluetooth-enabled peripheral device 20 can include a controller 50, a memory 55, and a communication unit 60 having a Bluetooth module 65.

The controller 50 controls a general operation of the Bluetooth-enabled peripheral device 20.

The Bluetooth module 65 enables a wireless connection using RF communication. The memory 55 stores a microcode of a program for processing and controlling the controller 50 and a variety of reference data. The Bluetooth module 65 exchanges data for a communication connection with the Bluetooth module 45 of the Bluetooth-enabled host device 15.

In general, the Bluetooth module 45 and Bluetooth module 65 include Bluetooth radios and additional circuitry. More specifically, the Bluetooth module 45 of the Bluetooth-enabled host device 15 and the Bluetooth module 65 of the Bluetooth-enabled peripheral device 20 include both a Bluetooth radio and a Bluetooth LE (BLE) radio. The Bluetooth radio and the BLE radio are typically on the same integrated circuit (IC) and share a single antenna, while in other implementations the Bluetooth radio and BLE radio are implemented as two separate ICs sharing a single antenna or as two separate ICs with two separate antennae.

The Bluetooth specification, i.e., Bluetooth 4.0: Low Energy, provides the Bluetooth-enabled peripheral device 20 with forty channels on 2 MHz spacing. The forty channels are labeled 0 through 39, which include 3 advertising channels and 37 data channels. The channels labeled as 37, 38 and 39 are designated as advertising channels in the Bluetooth specification while the remaining channels 0-36 are designated as data channels in the Bluetooth specification.

In a preferred embodiment, an actual transmit power of the BLE radio of the Bluetooth-enabled peripheral device 20 is set to be a negative dBm to reduce a range over which a signal from Bluetooth-enabled peripheral device 20 is detected by the Bluetooth-enabled host device 15.

A value reported as $T_x$ Power of the Bluetooth-enabled peripheral device 20 is further selected to have a value in dBm not ending in 0 or 5 to indicate to the Bluetooth-enabled host device 15 that this Bluetooth-enabled peripheral device 20 is a proximity pairing device. Although this is not enough information for the Bluetooth-enabled host device 15 to verify for certain that Bluetooth-enabled peripheral device 20 is a proximity pairing device, it is a good indication because traditionally Bluetooth Low Energy (BLE) devices are set to a transmit power of 0 dBm or +10 dBm and report that set value as Tx Power, for example.

In traditional BLE devices, the ADV_NONCONN_IND (non-connectable undirected packet) PDU (Packet Data Unit) can be used in advertising channels and includes AdvA and AdvData fields. The AdvA field contains the advertiser's public or random device address as indicated by PDU Type and the AdvData field may contain Advertising Data from the advertiser's host.

In the present invention, the Bluetooth-enabled peripheral device 20 advertising packet includes the AdvA and AdvData fields. Field AdvA, the Bluetooth-enabled peripheral device's 20 address, is set to BD_ADDR, the address of the Bluetooth radio of the Bluetooth-enabled peripheral device 15. Field AdvData is set to an Extended Inquiry Response (EIR) record of $T_x$ Power, with $T_x$ Power set to, for example, −21 dBm, regardless of the actual transmit power of the Bluetooth-enabled peripheral device 20. In various implementations, the predefined $T_x$ Power can be any pre-agreed upon number between the Bluetooth-enabled host device 15 and the Bluetooth-enabled peripheral device 20 that would typically be a negative number not ending in 0 or 5.

The Bluetooth-enabled peripheral device 20 is configured to advertise using the ADV_NONCONN_IND PDU on all three advertising channels, i.e., channels 37, 38 and 39, sequentially at a rate of 100 ms. Advertising on all three channels constitutes one advertising event. The peripheral may also be configured to advertise on just one or two channels within one advertising event.

Figure 2:
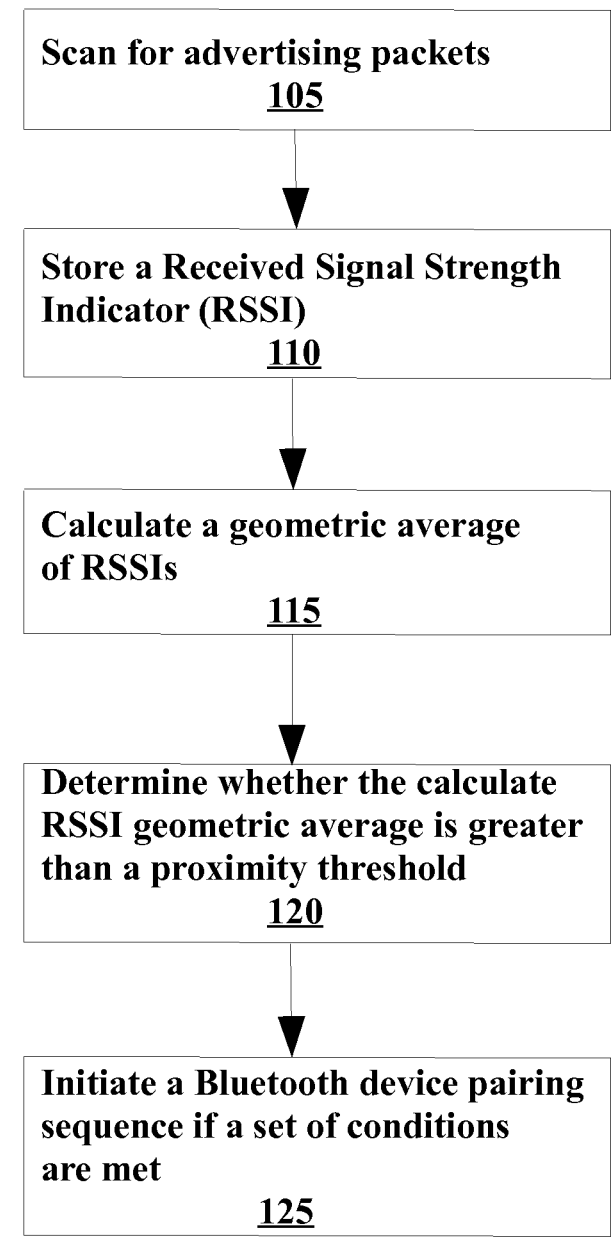
FIG. 2 is a flow diagram of a Bluetooth Low Energy (BLE) proximity process.

As shown in FIG. 2, the Bluetooth Low Energy (BLE) proximity process 100 includes scanning (105) for advertising packets periodically, e.g., every 100 ms.

When an advertising packet is detected, the BLE proximity process 100 stores (110) a Received Signal Strength Indicator (RSSI) in decibels (dB) in any of the following three ways. First, a RSSI of each packet received on each of the three advertising channels is saved. Or second, a highest RSSI of the three packets received in one advertising event can be saved. Or third, a RSSI from only one packet in no deterministic order may be saved.

The BLE proximity process 100 calculates (115) a geometric average of RSSIs over three advertising events from same AdvA.

The BLE proximity process 100 determines (120) whether the calculated RSSI average is greater than a proximity threshold. If so, the device originating the advertising events is considered in proximity. Proximity generally refers to a separation distance between the Bluetooth-enabled host device 10 and the Bluetooth-enabled peripheral device 20. This separation distance is typically less than 20 centimeters (cm), and preferably 2 cm or less. In implementations, once proximity is established, i.e., proximity=TRUE, the BLE proximity process 100 may change the proximity threshold so that the Bluetooth-enabled peripheral device would have to move further away from the Bluetooth-enabled host device before proximity becomes FALSE.

Once the BLE proximity process 100 determines that the Bluetooth-enabled peripheral device 20 is in proximity, the BLE proximity process 100 initiates (125) a Bluetooth device pairing sequence between the Bluetooth-enabled host device 15 and the Bluetooth-enabled peripheral device 20 if a set of conditions are met. Initiating (125) the Bluetooth device pairing sequence can include waiting for an input from a user. Initiating (125) the Bluetooth device pairing sequence can include a handshake with the Bluetooth controller 25 to indicate TRUE for proximity and a passing along the BD_ADDR of the Bluetooth-enabled peripheral device 20 by extracting it from AdvA of the ADV_NONCONN_IND PDU received from the Bluetooth-enabled peripheral device 20. The Bluetooth controller 25 can then decide whether to initiate pairing or perform one or more associated actions, such as seeking user permission to pair. If the Bluetooth controller 25 decides to initiate pairing, the Bluetooth controller 25 can use BD_ADDR to skip an Inquiry phase of pairing and go directly to a Page phase of pairing.

The set of conditions include the RSSI remaining above the proximity threshold for 500 ms, reported $T_x$ Power of the Bluetooth-enabled peripheral device equaling −21 dBm in AdvData, and the ADV_NONCONN_PDU being used in the advertising channels.

The above description provides an embodiment that is compatible with BLUETOOTH SPECIFICATION Version 4.0 [Vol 0], 30 Jun. 2010. However it should be understood that the approach is equally applicable to other wireless protocols (e.g., non-Bluetooth, future versions of Bluetooth, and so forth) in which communication channels are selectively established between pairs of stations. Furthermore, although certain embodiments are described above as not requiring manual intervention to initiate pairing, in some embodiments manual intervention may be required to complete the pairing (e.g., "Are you sure?" presented to a user of the host device), for instance to provide further security aspects to the approach.

In some implementations, the host-based elements of the approach are implemented in a software module (e.g., an "App") that is downloaded and installed on the host (e.g., a "smartphone"), in order to provide the pairing capability according to the approaches described above. In some instances, this software module is particularly tailored to a particular peripheral, peripheral type, peripheral manufacturer, and so forth, thereby limiting pairing further, which may provide a further security aspect to the approach.

While the above describes a particular order of operations performed by certain embodiments of the invention, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

While given components of the system have been described separately, one of ordinary skill will appreciate that some of the functions may be combined or shared in given instructions, program sequences, code portions, and the like.

The foregoing description does not represent an exhaustive list of all possible implementations consistent with this disclosure or of all possible variations of the implementations described. A number of implementations have been described. Nevertheless, it will be understood that various modifications may be made without departing from the spirit and scope of the systems, devices, methods and techniques described here. Accordingly, other implementations are within the scope of the following claims.

What is claimed is:

1. A method of pairing devices comprising:
  causing a Bluetooth-enabled host device and a Bluetooth-enabled peripheral device to be located proximate to each other, the Bluetooth-enabled host device comprising at least a processor, a memory and an antenna;
in the Bluetooth-enabled host device, detecting advertising packets broadcast by the Bluetooth-enabled peripheral device on one or more of a plurality of advertising channels;
saving a numeric indicator of each of multiple detected advertising packets;
determining an average numeric indicator from the saved numeric indicators of each of the separately detected advertising packets;
if the average numeric indicator exceeds a proximity threshold, determining whether a set of conditions are met by:
   modifying the proximity threshold to enable greater separation between the Bluetooth-enabled host device and the Bluetooth-enabled peripheral device; and
   determining whether the set of conditions are met if the average numeric indicator exceeds the modified proximity threshold; and
initiating a Bluetooth device pairing sequence between the Bluetooth-enabled host device and the Bluetooth-enabled peripheral device if the set of conditions are met.

2. The method of claim 1 further comprising completing the Bluetooth device pairing sequence using information in one of the advertising packets.

3. The method of claim 1 wherein the proximity threshold is dependent upon a type of Bluetooth-enabled peripheral device.

4. The method of claim 1 wherein the proximity threshold is dependent upon a type of Bluetooth-enabled host device.

5. The method of claim 1 wherein each of the advertising packets comprises a non-connectable undirected packet.

6. The method of claim 5 wherein the non-connectable undirected packet comprises:
a field containing a Bluetooth address of the Bluetooth-enabled peripheral device; and
a field containing an Extended Inquiry Response (EIR) record of a type $T_x$ Power Level containing a predefined value for transmit power ($T_x$ Power) of the Bluetooth-enabled peripheral device.

7. The method of claim 6 wherein the field containing the Bluetooth address of the Bluetooth-enabled peripheral device equals a device address of a Bluetooth radio of the Bluetooth-enabled peripheral device.

8. The method of claim 6 wherein the predefined value $T_x$ Power of the Bluetooth-enabled peripheral device is a number not ending in 0 or 5 to indicate to the Bluetooth-enabled host device that the Bluetooth-enabled peripheral device is a proximity pairing device.

9. The method of claim 1 wherein the numeric indicator is a received signal strength indicator (RSSI) of each of the separately detected advertising packets.

10. The method of claim 1 wherein the numeric indicator is a highest RSSI of the separately detected advertising packets.

11. The method of claim 1 wherein the numeric indicator is a RSSI of a first one of the detected advertising packets.

12. The method of claim 1 wherein the set of conditions comprises:
an average RSSI greater than the proximity threshold value for 500 milliseconds (ms); and
a pre-populated transmit power ($T_x$ Power) in the non-connectable undirected packet of Bluetooth-enabled peripheral device equals −21 dBm.

13. The method of claim 1 wherein the Bluetooth-enabled host device is selected from the group consisting of a smartphone, a tablet computer, a personal computer, a laptop computer, a notebook computer, a netbook computer, a radio, an audio system, an Internet Protocol (IP) phone, a communication system, an entertainment system, a headset and a speaker.

14. The method of claim 1 where the Bluetooth-enabled peripheral device is selected from the group consisting of a headphone, a headset, an audio speaker, an entertainment system, a communication system and a smartphone.

15. A system comprising:
a Bluetooth-enabled peripheral device comprising at least a radio transceiver, a baseband unit and a software stack, the Bluetooth-enabled peripheral device is configured to advertise a non-connectable undirected packet in all three Bluetooth Low Energy (BLE) advertising channels;
a Bluetooth-enabled host device comprising at least a processor, a memory and an antenna, the memory comprising a Bluetooth Low Energy (BLE) proximity pairing process; wherein
the Bluetooth-enabled host device is configured to detect advertising packets broadcast by the Bluetooth-enabled peripheral device on one or more of the three Bluetooth advertising channels, the BLE pairing process comprising:
saving a numeric indicator of each of three separately detected advertising packets;
determining an average numeric indicator from the saved numeric indicators of each of three separately detected advertising packets;
if the average numeric indicator exceeds a proximity threshold, determining whether a set of conditions are met by:
   modifying the proximity threshold to enable greater separation between the Bluetooth-enabled host device and the Bluetooth-enabled peripheral device; and
   determining whether the set of conditions are met if the average numeric indicator exceeds the modified proximity threshold; and
initiating a Bluetooth pairing sequence between the Bluetooth-enabled host device and the Bluetooth-enabled peripheral device if the set of conditions are met.

16. The system of claim 15 wherein the BLE process further comprises completing the Bluetooth device pairing sequence with information in one of the advertising packets.

17. The system of claim 15 wherein the proximity threshold is dependent upon a type of Bluetooth-enabled peripheral device.

18. The system of claim 15 wherein the proximity threshold is dependent upon a type of Bluetooth-enabled host device.

19. The system of claim 15 wherein the non-connectable undirected packet comprises:
a field containing a Bluetooth address of the Bluetooth-enabled peripheral device and equal to a device address of a Bluetooth radio of the Bluetooth-enabled peripheral device; and
a field containing an Extended Inquiry Response (EIR) record of a type $T_x$ Power Level containing a predefined value for transmit power ($T_x$ Power) of the Bluetooth-enabled peripheral device.

20. The system of claim 19 wherein the predefined $T_x$ Power of the Bluetooth-enabled peripheral device is a number not ending in 0 or 5 to indicate to the Bluetooth-enabled host device that the Bluetooth-enabled peripheral device is a proximity pairing device.

21. The system of claim 15 wherein the numeric indicator is a received signal strength indicator (RSSI) of each of the three separately detected advertising packets.

22. The system of claim 15 wherein the numeric indicator is a highest RSSI of the three separately detected advertising packets.

23. The system of claim 15 wherein the numeric indicator is a RSSI of a first one of the three detected advertising packets.

24. The system of claim 15 wherein the set of conditions comprises:
an average RSSI greater than the proximity threshold value for 500 milliseconds (ms); and
a transmit power ($T_x$ Power) in the non-connectable undirected packet of Bluetooth-enabled peripheral device equals −21 dBm.

25. The system of claim 15 wherein the Bluetooth-enabled host device is selected from the group consisting of a smartphone, a tablet computer, a personal computer, a laptop computer, a notebook computer, a netbook computer, a radio, an audio system, an Internet Protocol (IP) phone, a communication system, an entertainment system, a headset and a speaker.

26. The system of claim 15 where the Bluetooth-enabled peripheral device is selected from the group consisting of a headphone, a headset, an audio speaker, an entertainment system, a communication system and a smartphone.

27. A method comprising:
in a Bluetooth-enabled host device comprising at least a processor, a memory and an antenna, detecting advertising packets broadcast by the Bluetooth-enabled peripheral device on one or more of a plurality of advertising channels;
saving a numeric indicator of each of multiple detected advertising packets;
determining an average numeric indicator from the saved numeric indicators of each of the separately detected advertising packets;
if the average numeric indicator exceeds a proximity threshold, determining whether a set of conditions are met by:
modifying the proximity threshold to enable greater separation between the Bluetooth-enabled host device and the Bluetooth-enabled peripheral device; and
determining whether the set of conditions are met if the average numeric indicator exceeds the modified proximity threshold; and
initiating a Bluetooth device pairing sequence between the Bluetooth-enabled host device and the Bluetooth-enabled peripheral device if the set of conditions are met.

28. The method of claim 27 further comprising completing the Bluetooth device pairing sequence using information in one of the advertising packets.

29. The method of claim 27 wherein the proximity threshold is dependent upon a type of Bluetooth-enabled peripheral device.

30. The method of claim 27 wherein the proximity threshold is dependent upon a type of Bluetooth-enabled host device.

31. The method of claim 27 wherein each of the advertising packets comprises a non-connectable undirected packet.

32. The method of claim 31 wherein the non-connectable undirected packet comprises:
a field containing a Bluetooth address of the Bluetooth-enabled peripheral device; and
a field containing an Extended Inquiry Response (EIR) record of a type $T_x$ Power Level containing a predefined value for transmit power ($T_x$ Power) of the Bluetooth-enabled peripheral device.

33. The method of claim 32 wherein the field containing the Bluetooth address of the Bluetooth-enabled peripheral device equals a device address of a Bluetooth radio of the Bluetooth-enabled peripheral device.

34. The method of claim 32 wherein the predefined $T_x$ Power of the Bluetooth-enabled peripheral device is a number not ending in 0 or 5 to indicate to the Bluetooth-enabled host device that the Bluetooth-enabled peripheral device is a proximity pairing device.

35. The method of claim 27 wherein the numeric indicator is a received signal strength indicator (RSSI) of each of the separately detected advertising packets.

36. The method of claim 27 wherein the numeric indicator is a highest RSSI of the separately detected advertising packets.

37. The method of claim 27 wherein the numeric indicator is a RSSI of a first one of the detected advertising packets.

38. The method of claim 27 wherein the set of conditions comprises:
an average RSSI greater than the proximity threshold value for 500 milliseconds (ms); and
a pre-populated transmit power ($T_x$ Power) in the non-connectable undirected packet of Bluetooth-enabled peripheral device equals −21 dBm.

39. The method of claim 27 wherein the Bluetooth-enabled host device is selected from the group consisting of a smartphone, a tablet computer, a personal computer, a laptop computer, a notebook computer, a netbook computer, a radio, an audio system, an Internet Protocol (IP) phone, a communication system, an entertainment system, a headset and a speaker.

40. The method of claim 27 where the Bluetooth-enabled peripheral device is selected from the group consisting of a headphone, a headset, an audio speaker, an entertainment system, a communication system and a smartphone.

41. A method of pairing devices comprising:
causing a Bluetooth-enabled host device and a Bluetooth-enabled peripheral device to be located proximate to each other, the Bluetooth-enabled host device comprising at least a processor, a memory and an antenna;
in the Bluetooth-enabled host device, detecting advertising packets broadcast by the Bluetooth-enabled peripheral device on one or more of a plurality of advertising channels, the non-connectable undirected packet comprising:
a field containing a Bluetooth address of the Bluetooth-enabled peripheral device; and
a field containing an Extended Inquiry Response (EIR) record of a type $T_x$ Power Level containing a predefined value for transmit power ($T_x$ Power) of the Bluetooth-enabled peripheral device;
saving a numeric indicator of each of multiple detected advertising packets;
determining an average numeric indicator from the saved numeric indicators of each of the separately detected advertising packets;
if the average numeric indicator exceeds a proximity threshold, determining whether a set of conditions are met; and
initiating a Bluetooth device pairing sequence between the Bluetooth-enabled host device and the Bluetooth-enabled peripheral device if the set of conditions are met.

42. The method of claim 41 determining whether the set of conditions are met comprises:

modifying the proximity threshold to enable greater separation between the Bluetooth-enabled host device and the Bluetooth-enabled peripheral device; and determining whether the set of conditions are met if the average numeric indicator exceeds the modified proximity threshold.

43. The method of claim 41 wherein the field containing the Bluetooth address of the Bluetooth-enabled peripheral device equals a device address of a Bluetooth radio of the Bluetooth-enabled peripheral device.

44. The method of claim 41 wherein the predefined value $T_x$ Power of the Bluetooth-enabled peripheral device is a number not ending in 0 or 5 to indicate to the Bluetooth-enabled host device that the Bluetooth-enabled peripheral device is a proximity pairing device.

45. A method of pairing devices comprising:
causing a Bluetooth-enabled host device and a Bluetooth-enabled peripheral device to be located proximate to each other, the Bluetooth-enabled host device comprising at least a processor, a memory and an antenna;
in the Bluetooth-enabled host device, detecting advertising packets broadcast by the Bluetooth-enabled peripheral device on one or more of a plurality of advertising channels;
saving a numeric indicator of each of multiple detected advertising packets;
determining an average numeric indicator from the saved numeric indicators of each of the separately detected advertising packets;
if the average numeric indicator exceeds a proximity threshold, determining whether a set of conditions are met, the set of conditions comprising:
an average RSSI greater than the proximity threshold value for 500 milliseconds (ms); and
a pre-populated transmit power ($T_x$ Power) in the non-connectable undirected packet of Bluetooth-enabled peripheral device equals −21 dBm; and
initiating a Bluetooth device pairing sequence between the Bluetooth-enabled host device and the Bluetooth-enabled peripheral device if the set of conditions are met.

46. A system comprising:
a Bluetooth-enabled peripheral device comprising at least a radio transceiver, a baseband unit and a software stack, the Bluetooth-enabled peripheral device is configured to advertise a non-connectable undirected packet in all three Bluetooth Low Energy (BLE) advertising channels, the non-connectable undirected packet comprising:
a field containing a Bluetooth address of the Bluetooth-enabled peripheral device and equal to a device address of a Bluetooth radio of the Bluetooth-enabled peripheral device; and
a field containing an Extended Inquiry Response (EIR) record of a type $T_x$ Power Level containing a predefined value for transmit power ($T_x$ Power) of the Bluetooth-enabled peripheral device;
a Bluetooth-enabled host device comprising at least a processor, a memory and an antenna, the memory comprising a Bluetooth Low Energy (BLE) proximity pairing process; and
the Bluetooth-enabled host device is configured to detect advertising packets broadcast by the Bluetooth-enabled peripheral device on one or more of the three Bluetooth advertising channels, the BLE pairing process comprising:
saving a numeric indicator of each of three separately detected advertising packets;
determining an average numeric indicator from the saved numeric indicators of each of three separately detected advertising packets;
if the average numeric indicator exceeds a proximity threshold, determining whether a set of conditions are met; and
initiating a Bluetooth pairing sequence between the Bluetooth-enabled host device and the Bluetooth-enabled peripheral device if the set of conditions are met.

47. The system of claim 46 wherein determining whether the set of conditions are met comprises:
modifying the proximity threshold to enable greater separation between the Bluetooth-enabled host device and the Bluetooth-enabled peripheral device; and
determining whether the set of conditions are met if the average numeric indicator exceeds the modified proximity threshold.

48. The system of claim 46 wherein the predefined $T_x$ Power of the Bluetooth-enabled peripheral device is a number not ending in 0 or 5 to indicate to the Bluetooth-enabled host device that the Bluetooth-enabled peripheral device is a proximity pairing device.

49. A system comprising:
a Bluetooth-enabled peripheral device comprising at least a radio transceiver, a baseband unit and a software stack, the Bluetooth-enabled peripheral device is configured to advertise a non-connectable undirected packet in all three Bluetooth Low Energy (BLE) advertising channels;
a Bluetooth-enabled host device comprising at least a processor, a memory and an antenna, the memory comprising a Bluetooth Low Energy (BLE) proximity pairing process; wherein
the Bluetooth-enabled host device is configured to detect advertising packets broadcast by the Bluetooth-enabled peripheral device on one or more of the three Bluetooth advertising channels, the BLE pairing process comprising:
saving a numeric indicator of each of three separately detected advertising packets;
determining an average numeric indicator from the saved numeric indicators of each of three separately detected advertising packets;
if the average numeric indicator exceeds a proximity threshold, determining whether a set of conditions are met, the set of conditions comprising:
an average RSSI greater than the proximity threshold value for 500 milliseconds (ms); and
a transmit power ($T_x$ Power) in the non-connectable undirected packet of Bluetooth-enabled peripheral device equals −21 dBm; and
initiating a Bluetooth pairing sequence between the Bluetooth-enabled host device and the Bluetooth-enabled peripheral device if the set of conditions are met.

50. A method comprising:
in a Bluetooth-enabled host device comprising at least a processor, a memory and an antenna, detecting advertising packets broadcast by the Bluetooth-enabled peripheral device on one or more of a plurality of advertising channels;
saving a numeric indicator of each of multiple detected advertising packets;
determining an average numeric indicator from the saved numeric indicators of each of the separately detected advertising packets;

if the average numeric indicator exceeds a proximity threshold, determining whether a set of conditions are met, the set of conditions comprising:
an average RSSI greater than the proximity threshold value for 500 milliseconds (ms); and
a pre-populated transmit power ($T_x$ Power) in the non-connectable undirected packet of Bluetooth-enabled peripheral device equals −21 dBm; and
initiating a Bluetooth device pairing sequence between the Bluetooth-enabled host device and the Bluetooth-enabled peripheral device if the set of conditions are met.

51. The method of claim 50 wherein determining whether the set of conditions are met comprises:
modifying the proximity threshold to enable greater separation between the Bluetooth-enabled host device and the Bluetooth-enabled peripheral device; and
determining whether the set of conditions are met if the average numeric indicator exceeds the modified proximity threshold.

* * * * *